United States Patent [19]

Moore

[11] Patent Number: 4,865,866
[45] Date of Patent: Sep. 12, 1989

[54] PLASTIC EMULSION FOOD PRODUCT WITH A HARDSTOCK FAT

[75] Inventor: Harry Moore, Oakley, England

[73] Assignee: Lever Brothers Company, New York, N.Y.

[21] Appl. No.: 188,051

[22] Filed: Apr. 26, 1988

Related U.S. Application Data

[63] Continuation of Ser. No. 7,705, Jan. 28, 1987, abandoned.

[30] Foreign Application Priority Data

Feb. 5, 1986 [GB] United Kingdom ............... 8602873

[51] Int. Cl.$^4$ ............................................. A23D 3/00
[52] U.S. Cl. .................................... 426/602; 426/607
[58] Field of Search ........................ 426/601, 602, 607

[56] References Cited

U.S. PATENT DOCUMENTS

| | | | |
|---|---|---|---|
| 4,268,527 | 5/1981 | Matsuo et al. | 426/33 |
| 4,275,081 | 6/1981 | Coleman et al. | 426/601 X |
| 4,416,991 | 11/1983 | Matsuo et al. | 435/134 |
| 4,719,178 | 1/1988 | Macrae et al. | 435/135 |

FOREIGN PATENT DOCUMENTS

| | | |
|---|---|---|
| 170431 | 2/1986 | European Pat. Off. |
| 0209176 | 1/1987 | European Pat. Off. |
| 8203873 | 11/1982 | PCT Int'l Appl. |
| 8300161 | 1/1983 | PCT Int'l Appl. |
| 1577933 | 10/1980 | United Kingdom |

*Primary Examiner*—Donald E. Czaja
*Assistant Examiner*—Celine T. Callahan
*Attorney, Agent, or Firm*—Milton L. Honig

[57] ABSTRACT

Hardstock fats suitable for use in edible plastic compositions including emulsion products such as margarine and low fat spreads comprises a substantially saturated fat of which the 2-fatty acids consist substantially of $C_{16}$ and higher fatty acids and the 1, 3-fatty acids are randomly distributed and contains 50% or more $C_{14}$ and shorter chain fatty acids. The fats may be prepared by lipolytic rearrangement under the influence of a 1, 3-regiospecific lipase enzyme as rearrangement catalyst. The fats are also suitable for use in chocolate filling compositions.

4 Claims, No Drawings

PLASTIC EMULSION FOOD PRODUCT WITH A HARDSTOCK FAT

This is a continuation of Ser. No. 007,705, filed Jan. 28, 1987.

BACKGROUND OF THE INVENTION

1. Field of the Invention

This invention relates to fats and their preparation which are suitable for use in the manufacture of margarine and other plastic emulsion food spreads.

2. The Related Art

The composition of the fat component in margarine and other plastic emulsion food spreads usually comprises both hardstock and basestock. Each may be composed of one or more edible oils or fats, for the purpose of obtaining a blend of suitable physical and also chemical characteristics, the former to provide in particular good properties of plasticity and spreadability, and the latter to conform as far as possible to prevailing nutritional and health requirements. Ideally therefore, the total fat composition should show no change in the ratio solid and liquid glycerides present, over a wide range of temperatures encountered in varying climatic conditions of usage, the ratio being maintained to provide sufficient solid particles forming a matrix to enmesh the liquid phase and maintain the integrity appropriate for the desired consistency. The degree of hardness which can be permitted in the hardstock fat for the purpose of providing the matrix, is however limited by mouthfeel considerations, high-melting fat being difficult to assimilate.

SUMMARY OF THE INVENTION

The present invention provides hardstock fat suitable for us in edible compositions including margarine and other plastic emulsion food spreads and consisting substantially of saturated fatty acid triglycerides, of which the $\alpha$ (1,3) fatty acids are randomly distributed and at least 50% on a molar basis consist of $C_{14}$ and lower fatty acids and the $\beta$ (2) fatty acids consist substantially of $C_{16}$ and higher fatty acids.

DETAILED DESCRIPTION

The fat compositions of the invention may be blended with others to provide a total fat composition according to the invention, for margarine and other emulsion food spreads, or the blends may be used to prepare shortenings. Suitable edible oils and fats for this purpose include vegetable oils or fat for example soyabean, groundnut, cottonseed, sunflower, safflower and palm oil or palm olein i.e a lower-melting fraction. These blends may also be used in the preparation of other culinary fat compositions for example low fat spreads where plastic condition is desirable, and also for chocolate fillings, which may include other filling materials eg.. ground nuts for example hazelnut, almond and brazil nut. The amount of hardstock fat used in such blends is preferably 5-25% by weight, for shortenings and plastic emulsion food fats and 15 to 30% for chocolate filling fats. The composition of the hardstock fats of the invention may be expressed by the equation $Z^2=4xy$ where $x=HHH$, $y=MHM$ and $Z=HHM$; $M=C_{14}$ and lower acids and $H=C_{16}$ and higher acids, wherein all the acids are saturated. Olein fractions of such fats contain less HHH and stearin fractions of such fats are correspondingly enriched in HHH. The preferred product of the invention correspond to compositions containing not more than 25% HHH.

The fats of the present invention may be obtained by selective rearrangement of fatty reactant mixtures comprising glycerides and containing suitable proportions of fatty acid residues, the rearrangement being effected in the manner described in our British specification No. 1577933 using 1, 3-selective lipase enzymes as rearrangement catalyst, as described in that patent specification. The fatty reactant mixture may comprise saturated fatty acid residues only, or the $C_{16}$ and/or higher fatty acids residues may be provided by using suitable sources of $C_{16}$ and/or unsaturated $C_{18}$ fatty acid residues and subsequently hydrogenating the enzyme rearranged product to saturate these and obtain the products of the present invention. The lower fatty acids may be obtained from the so-called lauric fats, consisting substantially of mixtures of $C_8$ to $C_{14}$ saturated fatty acids, eg. coconut, palm kernel and babassu oils. The preparation of hardstock fats is also described in our EP specification No. 00170431.

The enzyme process to obtain the hardstock fats of the invention may be used to effect rearrangement between glycerides, if necessary with fractionation and/or saturation before or after the rearrangement. They may alternatively be obtained by reaction between glycerides and free fatty acids, or alkyl esters of fatty acids. Again, 1, 3 selective lipase enzymes may be used to provide the hardstock products of the present invention by synthesis involving reaction with free fatty acids or their alkyl esters and glycerol or partial glycerides. The enzyme reaction is effected between a substantially unsaturated $C_{18}$ vegetable oil with at least 50%, more particularly 75-125% of its weight of one or more of the lower acids. Suitable oils for this purpose include soyabean, groundnut, safflower, sunflower and rapeseed, including high erucic rapeseed, palm oil and fractions thereof.

The unfractionated hardstock fats of the present invention preferably contain not more than 20%, more particularly not more than 15% $H_3$ triglycerides.

An advantage of the hardstock fat of the present invention is that, since the HHH content is relatively low, the unfractionated fat may be used as the hardstock thus effecting considerable economy and maximum utilisation of the fat. The precise nature of the fatty acid residues may be moderated according to the physical requirements of the margarine fat in which the hardstock fat is incorporated.

EXAMPLE

Equal parts by weight of refined soya bean oil and lauric acid were rearranged in a solution of hexane which was passed down a reactor column maintained at 45° C. and containing a packed bed of *Mucor meihei* lipase supported on Celite, pre-wetted to a water content of 10% and conditioned by slurrying in a mixture of hexane with soya bean oil before use. The residence time of the feed was approximately 20 minutes. The feed was pre-wetted by passage through silica gel with added water giving a water activity $A_W$ of 0.85.

The reactor effluent collected over 100 hours was distilled to remove solvent, extracted with methanol to remove free fatty acid, and hydrogenated using an active nickel catalyst to an iodine value less than 2.

The hardstock fat obtained was analysed by carbon number distribution and blended with sunflower oil to produce margarine fat containing 8% and 10% hardstock fat. These were formulated to produce margarine, a water-in-oil emulsion of the wholly liquid margarine fat being prepared with the addition of conventional ingredients and chilled and worked in a scraped-surface heat exchanger and resting units in series. The hardness (C) values and thinness values of the margarine product were measured by penetrometer and viscosity. The solids content of the fat was measured by pulse NMR. The data obtained is given in the accompanying tables. The margarine product on this evidence appears satisfactory, and exhibited good mouth-feel characteristics. Good quality is indicated by viscosity below 150 centipoise, more preferably below 100 cp. at 35° C.

TABLE I

| Temp °C. | Margarine | |
|---|---|---|
| | 10% | 8% |
| | C Values | |
| 5 | 305 | 345 |
| 10 | 245 | 250 |
| 15 | 185 | 140 |
| 20 | 130 | 90 |
| | Viscosity (Centipoise) | |
| 35 | 94 | 68 |

TABLE 2

| CARBON NUMBER | | | | | | | | | | |
|---|---|---|---|---|---|---|---|---|---|---|
| 36 | 38 | 40 | 42 | 44 | 46 | 48 | 50 | 52 | 54 | |
| 1.0 | 0.6 | 1.5 | 35.4 | 2.9 | 7.7 | 35.6 | 2.2 | 3.6 | 8.4 | |

| NMR SOLIDS | | | | | | |
|---|---|---|---|---|---|---|
| N20 | N30 | N35 | N40 | N45 | N50 | N55 |
| 96.7 | 94.9 | 87.7 | 64.3 | 23.4 | 2.6 | 1.4 |

I claim:

1. A plastic emulsion food product comprising:
   (a) from 5 to 25% by weight of a hardstock fat which is a mixture of substantially saturated fatty acid triglycerides, said triglycerides in a 1, 3-position thereof consisting essentially of at least 50% on a molar basis of $C_{14}$ and lower fatty acids, and in a 2-position thereof consisting essentially of $C_{16}$ and higher fatty acids, said triglycerides having a composition that lies on the curve given in a ternary molar composition diagram HHM/MHM/HHH by the expression $Z^2=4XY$ where X=HHH, Y=MHM and Z=HHM; M=$C_{14}$ and lower acids and H=$C_{16}$ and higher acids wherein all the said acids are substantially saturated and not more than 25% HHH is present, said hardstock fat prepared by the steps comprising:
   (i) reacting a fatty reactant mixture comprising a $C_{16}$ and a $C_{14}$ or lower fatty acid residue containing reactant in the presence of a 1, 3-selective lipase as rearrangement catalyst to obtain a resultant composition; and
   (ii) hydrogenating the resultant composition to said substantially saturated fatty acid triglycerides; and
   (b) the balance being an edible vegetable oil selected from the group consisting of soybean, groundnut, cottonseed, sunflower and palm oil.

2. A plastic emulsion according to claim 1 wherein the hardstock fat contains not more than 20% HHH.

3. A plastic emulsion according to claim 2 wherein the hardstock fat contains not more than 15% HHH.

4. A plastic emulsion according to claim 1 wherein the hardstock has a solids content at $N_{20}$ of about 96.7 and at $N_{55}$ of about 1.4 as measured by NMR.

* * * * *